Aug. 3, 1954

I. W. DOYLE 2,685,239

HIGH-SPEED AERIAL CAMERA SHUTTER

Filed May 27, 1949

INVENTOR
Irving W. Doyle
BY
Blair + Black
ATTORNEYS

Aug. 3, 1954      I. W. DOYLE      2,685,239
HIGH-SPEED AERIAL CAMERA SHUTTER Filed May 27, 1949      5 Sheets-Sheet 4

INVENTOR
*Irving W. Doyle*
BY
*Blair + Black*
ATTORNEYS

Aug. 3, 1954     I. W. DOYLE     2,685,239
HIGH-SPEED AERIAL CAMERA SHUTTER
Filed May 27, 1949     5 Sheets-Sheet 5

INVENTOR
Irving W. Doyle
BY
Blair & Black
ATTORNEYS

Patented Aug. 3, 1954

2,685,239

UNITED STATES PATENT OFFICE 2,685,239

HIGH-SPEED AERIAL CAMERA SHUTTER

Irving W. Doyle, Massapequa, N. Y., assignor to Fairchild Camera and Instrument Corporation, Jamaica, N. Y.

Application May 27, 1949, Serial No. 95,849

9 Claims. (Cl. 95—53)

This invention relates in general to a combined aerial camera cone and shutter construction, and in particular to a motor-driven, high speed precision shutter attachable to an aerial camera cone and demountable relative to a fixed optical system supported thereby.

High altitude aerial photography for military mapping or commercial surveying purposes demands increasingly higher degrees of accuracy, which can only be attained by precise relationship of the structural elements of the aerial camera and the provision of accurately precise timing of the operation of the several mechanisms in the camera which drive the film and shutter.

If the ultimate map made up in the usual manner from a succession of exposures is to have the required degree of sharpness and resolution, the relationship between the lens system and the focal plane of the camera must at all times be precise and the selected shutter speed must be highly accurate, particularly so where color film is used. In many cameras of the type under consideration attainment of this precise relationship between the lens system and the focal plane is often difficult because of structural complexities, and because it is impossible to remove the shutter without disturbing the lens system, particularly where the lens system is complex and is constituted by a number of lens elements. It not infrequently occurs in the normal use of such a camera that the shutter has to be removed for one reason or another. Hence it follows that if the supporting structure for the lens system and certain structural features of the shutter are such that the shutter may be readily removed and reinstalled without disturbing the lens system, the lens system-focal plane relationship may be maintained as a constant because of the rarely occurring necessity for disturbing the lens system.

It is accordingly among the objects of this invention to provide in an aerial camera of the type under consideration a simple structural relationship among the shutter, lens system and focal plane, whereby to attain the several prerequisites and advantages above set forth.

With respect to shutters for cameras of the type under consideration, various types have been used, including between-the-lens and focal plane shutters, one or the other being used in accordance with the particular requirements to be fulfilled by the camera. While multiple blade between-the-lens shutters have been developed to a relatively high degree of perfection, they have nevertheless certain inherent disadvantages, particularly where high shutter speeds are prerequisite. Because of the structural relationship of the blades, each blade must be quite thin and accordingly tend to distort and flutter when moved at high speed. Furthermore, such a shutter is not conveniently interchangeable without disturbing the optical system of the camera. Then too, such multiple blade shutters usually must be controlled by retards, shock absorbers, snubbers and the like, greatly complicating the physical structure of the shutter and rendering its operation inaccurate, particularly at high speeds where the factors of acceleration and deceleration are difficult to control. It, of course, goes without saying that such shutters are also characterized by a relatively large number of moving parts made of expensive materials and that require highly skilled labor not only to make but also to assemble and test and maintain.

It is accordingly a further object of this invention to provide a high speed between-the-lens type shutter that obviates the aforementioned difficulties in addition to others in a thoroughly practical, efficient and simple manner.

In the drawing, wherein there is shown one form of the invention.

Similar reference characters refer to similar parts throughout the several views of the drawing.

In accordance with one embodiment of the invention, the camera cone comprises a single casting of generally inverted frustoconical shape, with its upper surface defining the focal plane of the camera, and its lower portion providing supports for the optical system, which supports are at all times fixed relative to the focal plane. This lower portion of the cone is so formed as to comprise a horizontal compartment for the reception of a between-the-lens shutter which, when in proper operating position, lies between the lens elements of the optical system.

The single blade shutter, together with a conventional iris diaphragm, is mounted on a support, which support extends into the above-mentioned cone compartment when the shutter is assembled with the cone. This support, in turn, is carried by brackets or other structural elements which are demountably fastened to the side of the cone and support in proper operative relationship to the various control and driving elements for the shutter blade and iris diaphragm. These supports thus carry a small, high-speed, electric motor which drives a cam into which a shutter blade driving pin may be inserted. When the pin is so inserted, the shutter blade is accelerated and decelerated at positive, predetermined rates to open position, maintained therein for the predetermined period of time, and then again accelerated and decelerated at positive, predetermined rates to closed position. Thus by accurately controlling the motor speed and by properly designing the cam, highly accurate shutter speeds of widely varying values are readily attainable.

Insertion of the shutter blade driving pin into the cam is effected by a spring, this spring acting against the pull of a holding magnet which, upon deenergization, permits the spring bias to effect the shutter blade actuation. The time of magnet release is precisely controlled by way of a simple circuit including a vacuum tube, so that the blade driving pin may be released to actuate the shutter blade in precisely timed relation to the high speed rotation of the pin driving cam. Desirably a time delay relay controlled solenoid is energized slightly in advance of deenergization of the release magnet, and this solenoid controls a safety catch which effectively locks the blade driving pin out of engagement with the cam should the pin holding magnet or its controlling tube fail for any reason.

Figures 1, 10:
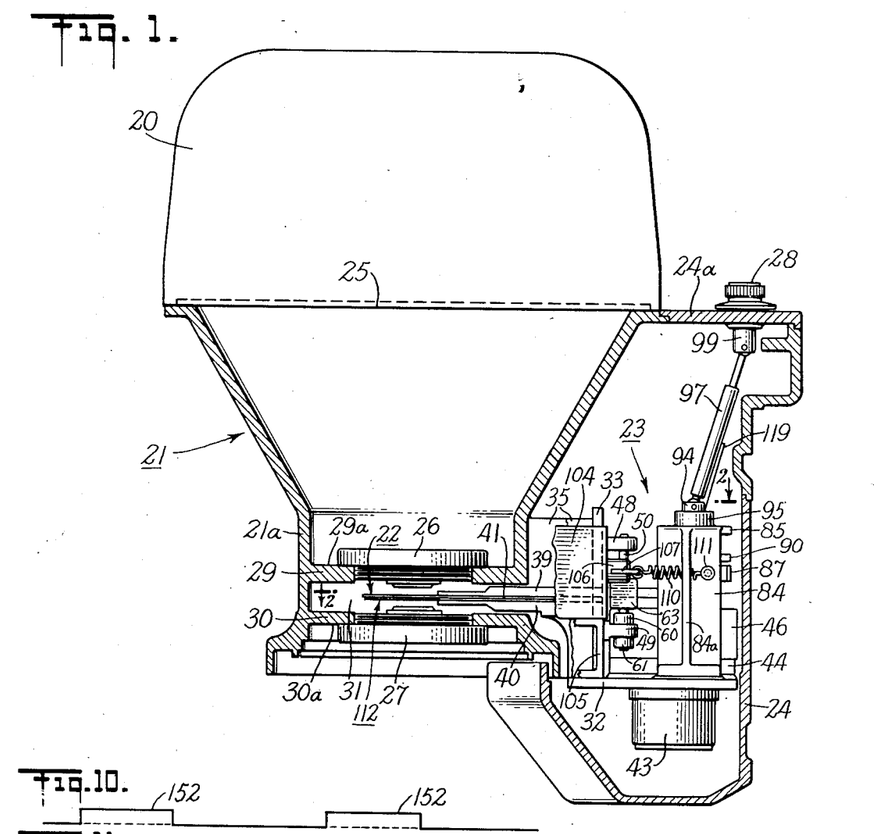
Figure 1 is an elevation, partly in section, of an aerial camera showing the relationship of the focal plane and the optical system to the shutter, as well as portions of the shutter operating mechanism.
Figures 10–15 are a series of curves showing the relationship among the cycles of various portions of the shutter control system.

Referring now to the drawing, and to Figure 1 in particular, there is shown a generalized view of an aerial camera comprising a magazine 20, a cone generally indicated at 21, a shutter and iris diaphragm assembly, generally indicated at 22, and a shutter blade and iris diaphragm driving and control assembly generally indicated at 23, mounted exteriorly of cone 21 and enclosed by a suitable casing or cover 24. The upper edge or surface 25 of cone 21 may define the focal plane of the camera, while in the lower portion of the cone are mounted upper and lower lens elements 26 and 27, comprising the optical system. The shutter blade and diaphragm assembly 22, when in proper operative position, is disposed between lens elements 26 and 27, a manually operable shutter speed control knob 28 being conveniently mounted on the upper portion 24a of the casing 24. A knob similar to knob 28, but not shown on the drawing, is provided for adjusting the iris diaphragm to set the aperture to the desired value.

Still referring to Fig. 1, it may be seen that cone 21 is generally of inverted frustoconical shape, although in certain types of camera it might be desirable that the cone be cylindrical or any other suitable shape. In either event, however, the entire cone structure comprises a single casting whose upper edge 25, as noted, comprises the focal plane of the camera. In the lower portion 21a of the cone are formed integral and preferably annular spaced shelves 29 and 30. The top surface 29a of shelf 29, and the bottom surface 30a of shelf 30 are accurately machined relative to upper cone edge 25 so that the axial distance between edge 25 and surface 29a, and the axial distance between edge 25 and shelf surface 30a accord precisely with predetermined, fixed values for these distances, whereby the shelf surfaces 29a and 30a are accurately related to the focal plane defined by upper cone edge 25. Thus it follows that as all portions of the cone, including shelves 29 and 30, are integral, i. e. are parts of but a single casting, there can be no variation of the axial distance between the shelf surfaces and the focal plane of the camera. Inasmuch as the lens elements 26 and 27 strictly conform to predetermined formulae, their relation to the focal plane upon installation on shelves 29 and 30 is accurate and fixed. In view of the fact that there is seldom any need to remove lens elements 26 and 27, their relationship to the focal plane as defined by upper cone edge 25 remains a constant.

It will now appear that cone shelves 29 and 30, with their respective lens elements 26 and 27, form a narrow compartment 31 within lower cone portion 21a, within which the shutter blade and diaphragm assembly 22 is disposed when the shutter is mounted on the cone. As will be described in detail hereinafter, this shutter blade and diaphragm assembly is readily demountable from its illustrated operative position, and accordingly it follows that in the event of damage to the shutter or its operating mechanism, necessitating its removal for replacement or repair, the assembly 22 may be easily removed without disturbing in any way whatsoever the relationship between the optical system and the focal plane.

Figure 2:
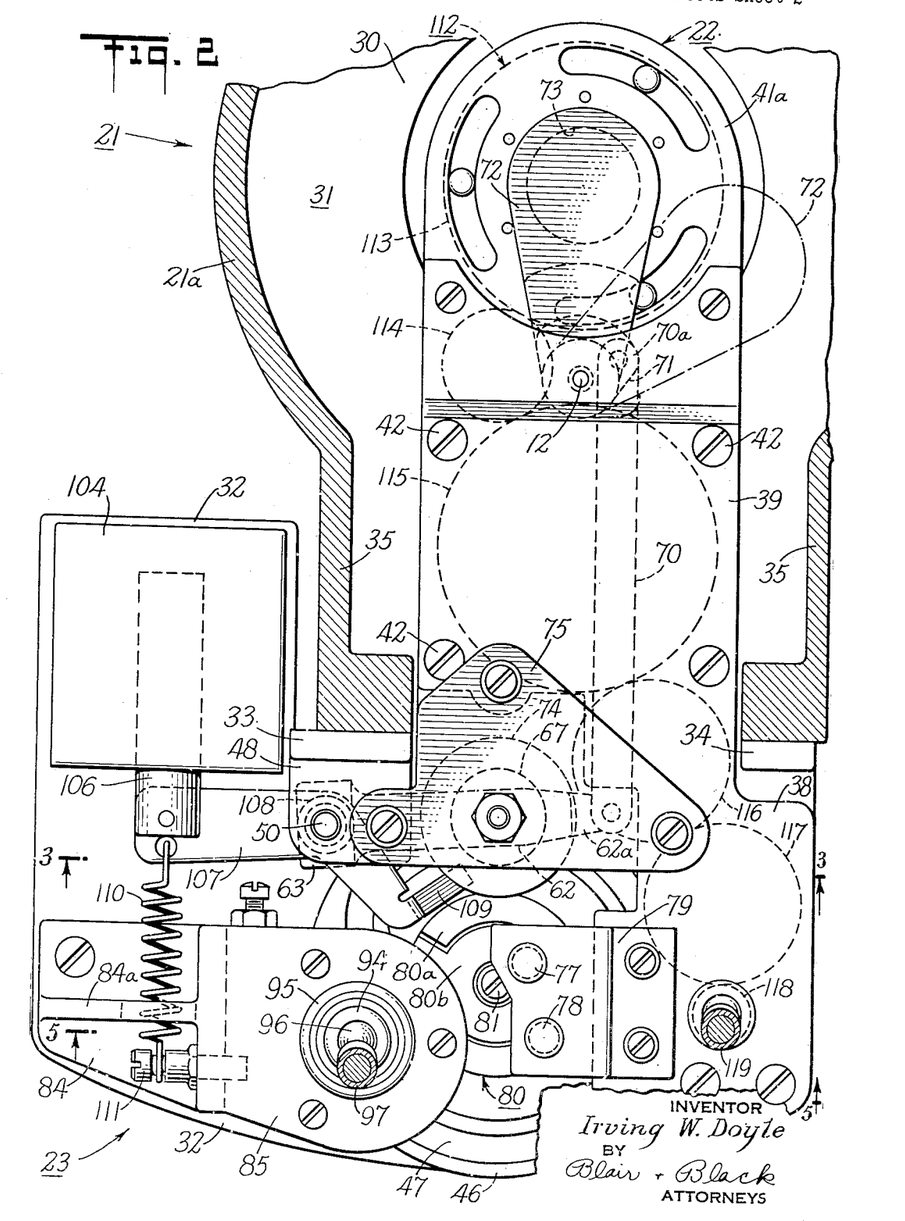
Figure 2 is an enlarged fragmentary horizontal staggered section taken along the line 2—2 of Figure 1.
Figure 3:
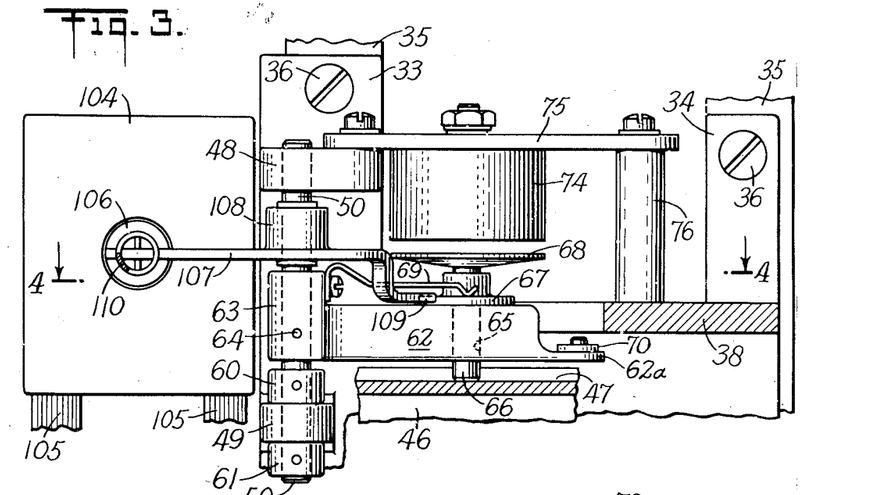
Figure 3 is a vertical fragmentary section taken along the line 3—3 of Figure 2.

In Figure 2 are shown various structural details of the shutter blade driving and controlling assembly 23. This assembly includes a main mounting plate 32 (Figure 5) and this plate may have integrally formed therewith or fastened thereto a pair of upright struts 33 and 34 by which the assembly 23 may be fastened to a boss 35 extending laterally and outwardly of lower cone portion 21a. These struts 33 and 34 are also shown in Figure 3, screws 36 being illustrative means of attaching the struts to boss 35. At one corner of plate 32 (Figure 5) is a post 37, to the top of which is fastened in any suitable manner a horizontal plate 38. This plate is shaped as shown in Figure 2, and includes a shelf-like extension 39 which extends into cone compartment 31 through boss 35 when the shutter is installed. This plate extension 39, as shown in Figure 1, provides together with a lower plate 40 an elongated supporting structure for a plate 41 on the extremity 41a of which are mounted the shutter and iris diaphragm, as will be described hereinafter (see Figure 2).

Plates 39, 40 and 41 are securely held together in assembled relation by a suitable number of screws 42 extending through the three plates. Thus these plates form an elongated shelf-like extension which reaches into cone compartment 31 (Figure 1) between the lens elements 26 and 27 so as to demountably support the shutter blade and iris diaphragm assembly 22 in proper relationship to the lens element. It might here be noted that lower supporting plate 40 may be integral with or secured to plate 32 in any suitable manner.

Figure 8:
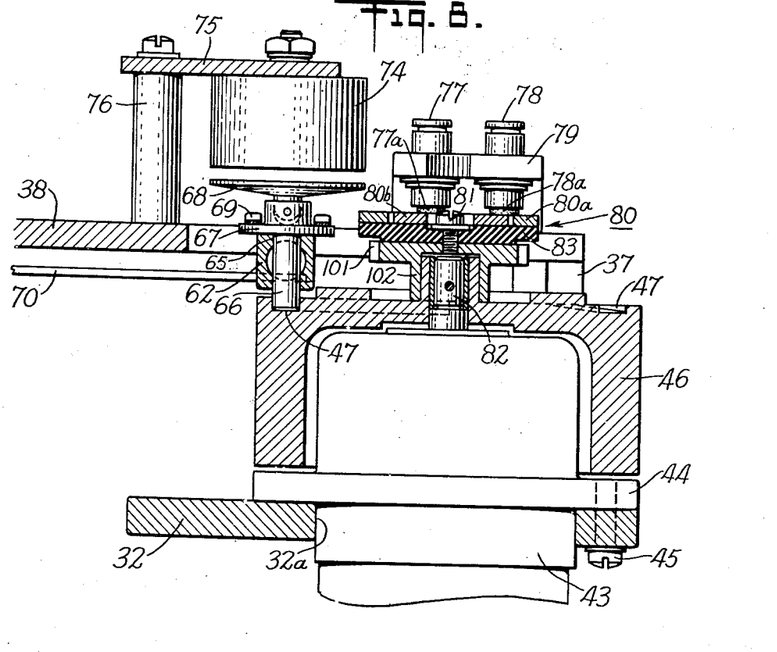
Figure 8 is a vertical fragmentary section taken along the line 8—8 of Figure 5.

As best shown in Figure 8, lower plate 32 is provided with an opening 32a through which the lower portion of a motor 43 extends, the motor casing being provided with a flange 44 which may conveniently be secured to plate 32 by screws 45, thus to hold the motor securely in position thereon. Motor 43 is preferably a shunt wound reversible motor of fractional horsepower capable of operating at speeds up to 5000 R. P. M. With such a motor it follows that its speed of operation may be controlled with extreme accuracy, this being accomplished in a manner hereinafter to be described.

Figure 4:
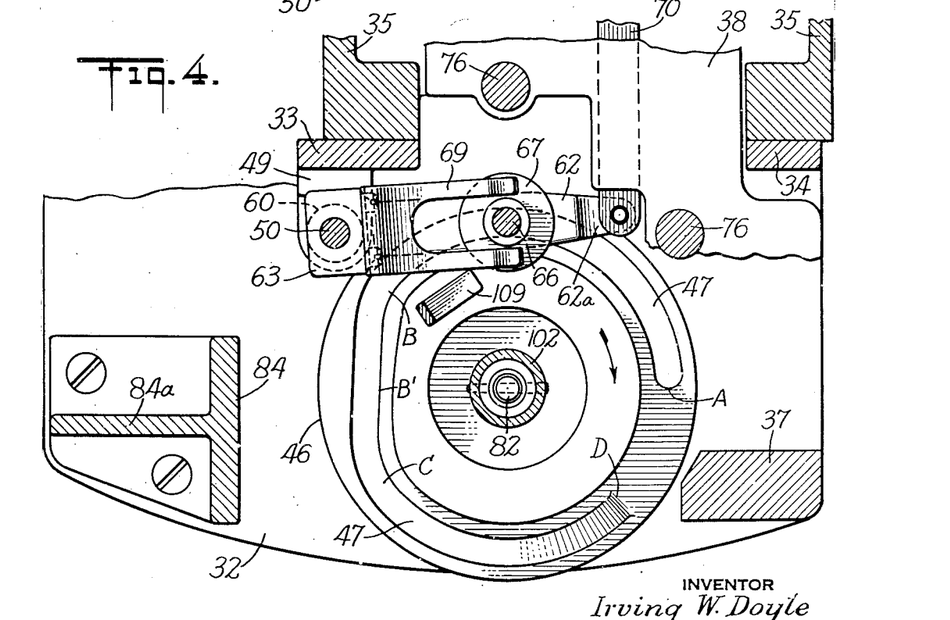
Figure 4 is a horizontal fragmentary section taken along the line 4—4 of Figure 3.

To the armature of motor 43 is secured an inverted, cup-shaped flywheel 46, in the upper surface of which is cut a cam slot 47 (see Figure 4). This cam slot is of fixed radius between points A and B and between points C and D. Between points B and C the cam slot radius decreases in predetermined amount to point B' and then increases by predetermined amount from point B' to point C, this for a purpose described hereinafter.

Extending outwardly from strut 33 (see Figure 1) are a pair of lugs 48 and 49 which respectively journal the upper and lower ends of a shaft 50. Axial movement of this shaft is confined by a pair of collars 60 and 61 secured to the lower end of shaft 50 on opposite sides of lug 49. Thus the shaft may rotate in lugs 48 and 49, but may not move axially relative thereto. A follower arm 62 has a hub 63 fastened to shaft 50 by a set screw 64, this arm accordingly being rotatable relative to the top of flywheel 46, over one side of which the arm lies, as shown in Figure 4. Arm 62 is drilled as at 65 to reciprocably receive a follower pin 66, the upper end of this pin having a flange 67 which limits downward movement of the pin. On the upper end of pin 66 is secured a magnet armature 68, while the pin assembly, including the pin, the flange and the armature, are under a constant downward bias by a relatively strong leaf spring 69 fastened to hub 63. This spring accordingly tends to force pin 66 downwardly toward cam 46 so that the pin may enter cam groove 47.

A link 70 is pivotally attached to the free end 62a of follower arm 62, this link being slidably disposed between plates 39 and 40 (Figure 1). The outer end 70a (Figure 2) of link 70 is pivotally attached to the crank arm 71 of a shutter blade 72, this blade being pivotally mounted on a pin 73 suitably secured to one or more of plates 39, 40 and 41. The outer end of plate 72 is sufficiently large as to completely cover an aperture 120 formed in the end 41a of plate 41, this aperture being in axial alignment with the optical system of the camera.

From the foregoing, it will now appear that if the shutter motor is in operation, cam 47 (Figure 4) rotates clockwise. If pin 66 is free to enter the cam slot under the bias of spring 67, it so does and accordingly acts as a follower, following the contour of the cam as it rotates. In view of the fact that the cam is of fixed radius from A to B, there is no movement of the follower pin 66 along this portion of the cam. However, from points B to C, the cam radius varies so that as the follower pin follows from point B to B' of the cam, it is moved toward the axis of the flywheel 46 and accordingly swings follower arm 62 clockwise. This clockwise movement of the arm moves link 70 downwardly, as viewed in Figure 2, and accordingly shutter blade 72 clockwise to its open or dotted line position. By varying the contour on opposite sides of point B' (Figure 4) of cam 47, the total open time of the shutter may be predetermined as desired. As the follower pin 66 follows the cam slot from point B' to C, reverse movement of the pin, link 70 and blade 72 (Figure 2) ensues, thus to swing the blade counterclockwise back to its closed or full line position. Thus it follows that for one revolution of flywheel 46 and accordingly cam 47, the shutter blade opens and closes to effect an exposure. In view of the fact that the cam action is positive, and because there is but a single shutter blade 72, there is little or no tendency of the shutter blade to distort or flutter during its opening and closing movement. Furthermore, because there are but few moving parts, namely follower arm 62, link 70 and blade 72, and as these parts are small and light, and because of the provision of flywheel 46, acceleration and deceleration during both the opening and closing of the shutter blade is controlled and smooth, reducing to a negligible minimum any possibility of any of these parts becoming broken or damaged over extended periods of use. Inasmuch as the rate of rotation of the motor and accordingly of cam 47 can be governed, as will be described, to a tolerance of 1 to 2%, the selected shutter speed is highly accurate, thus assuring good photographic results.

From the foregoing it follows that as long as follower pin 66 engages cam 47, the shutter will open and close for each revolution of the cam. This, of course, is undesirable because of the high speed at which the motor operates. Hence I have made provision for holding follower pin 66 out of cam slot 47 until such time as it is desired to operate the shutter to make an exposure. As shown in Figure 3, a magnet 74 is suspended from a strap 75 whose opposite ends are attached respectively to lug 48 and a post 76 carried by plate 38. Magnet 74 directly overlies armature 68 so that when the magnet is energized, it pulls the armature upwardly against the bias of spring 69, thus withdrawing follower pin 66 from cam 47. In this position, of course, the pin cannot follow the cam and accordingly the shutter remains closed. When an exposure is desired, magnet 74 is rapidly deenergized in a manner that will be described to release armature 68 so that its spring 69 can drive follower pin 66 into the cam slot.

Figure 7:
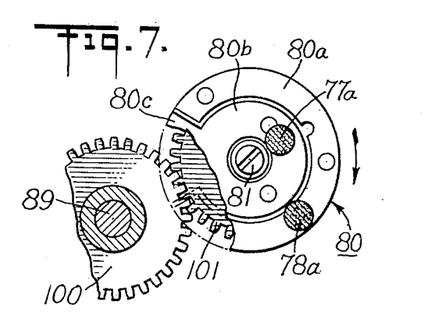
Figure 7 is a horizontal fragmentary staggered section taken along the line 7—7 of Figure 5.

To accomplish this operation of magnet 74, its circuit includes a pair of contacts 77 and 78, which are mounted in a small Z-shaped bracket 79 fastened to plate 38. The lower ends 77a and 78a (see Figure 8) of these contacts 77 and 78 engage a contact disc generally indicated at 80. This disc is fastened as by a screw 81 to a gear 101, in turn secured to the upper end of a shaft or post 82, which may conveniently be an extension of the armature shaft of motor 43. As is more clearly shown in Figure 7, contact disc 80 has an outer conductive section 80a and an inner conductive section 80b, which are separated from one another and are fastened to a support 83 (Figure 8) formed of a suitable dielectric material. Thus these sections 80a and 80b (Figure 7) are insulated from one another. Contactor end 77a is always in engagement with section 80b, whereas contact end 78a overlies section 80a. It will be noted, however, that contact 80b includes a segment 80c which intervenes the ends of section 80a and is insulated therefrom. Accordingly, when disc 80 has rotated to the point where contact end 78a is in engagement with segment 80c, the effect is the same as that of closing a switch, as the two contact ends 77a and 78a are simultaneously in engagement with the conductive section 80b of the contact disc. During this time magnet 74 (Figure 3) is energized so that follower pin 66 is withdrawn from cam slot 47 in the manner described above. Because of the small diameter of contact disc 80, e. g. of the order of 1.25", and because of the high rate of rotation of the contact plate, e. g. up to 5000 R. P. M., the speed of magnet response must be of a very high order, if properly timed exposure is to be effected and double exposure is to be avoided. This magnet response is effected in a manner that will be described hereinbelow.

As has been pointed out hereinbefore, it is desirable to vary the motor speed in order to effect different shutter speeds. To control the rate of rotation of motor 43, I have provided the electrical governing mechanism shown in Figures 5, 6 and 7 on sheet 4 of the drawing. Inasmuch as this governing mechanism is of conventional nature, it will suffice to include herein but a brief description of its essential parts.

Figure 5:
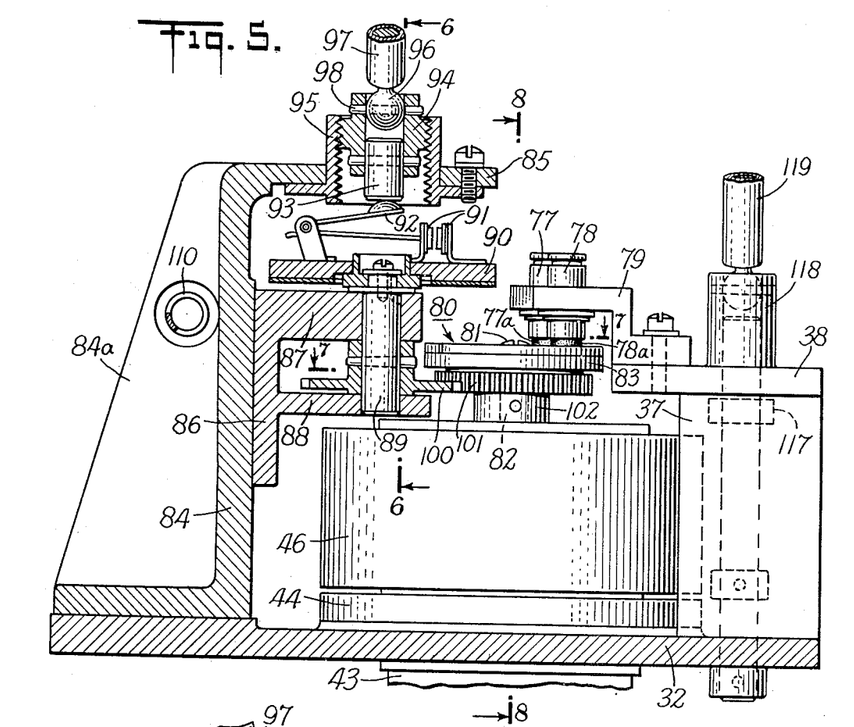
Figure 5 is a vertical fragmentary section taken along the line 5—5 of Figure 2.
Figure 6:
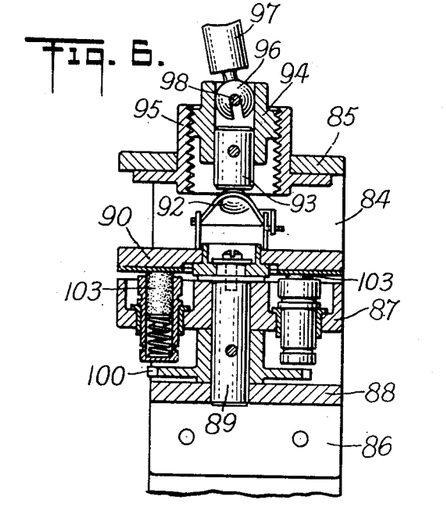
Figure 6 is a vertical fragmentary section taken along the line 6—6 of Figure 5.

Thus, as shown in Figure 5, plate 32 carries a bracket 84 having a horizontal supporting plate 85 and carrying a bracket 86 on a vertical face. Bracket 86 includes a pair of spaced bosses 87 and 88 in which is journaled a stud shaft 89. The upper end of this stud shaft carries a disc 90 on which are mounted the governor contacts 91. The spacing between these contacts is determined by the vertical position of an arm 92 which bears against the bottom of a pin 93 secured to a threaded plug 94 which is threaded into a collar 95 fastened to plate 85. Plug 94 is drilled to receive the forked end 96 (Figure 6) of an adjusting rod 97, this forked end 96 coacting with a pin 98 extending through the hole in plug 94. As shown in Figure 1, rod 97 is of the telescopic type, and has its upper end secured to a fitting 99 which is connected to knob 28 in any suitable manner. It may now be seen that as knob 28 is rotated in one direction or the other, rod 97 and accordingly plug 94 (Figure 5) rotate with it, thus to adjust the vertical position of pin 93, and also that of arm 92, hence setting or adjusting the spacing between governor contacts 91. Variation in the spacing of these contacts determines the speed of rotation of motor 43.

A gear 100 is pinned to shaft 89 between lugs 87 and 88, and this gear meshes with gear 101 whose hub 102 is pinned to armature shaft extension 82. Thus, as motor 43 rotates, gear 101 is driven to rotate disc 90. Governor contacts 91 open and close intermittently because of the effect of centrifugal action, the ratio of closed time to open time determining the rate of rotation of motor 43. As these contacts close, brushes 103 (Figure 6) are electrically connected, and being in the circuit of motor 43, cause intermittent energization of the motor. Thus the speed of motor 43 is easily and accurately controlled by manipulation of knob 28 (Figure 1), thereby to quickly and accurately set the shutter speed desired.

Under certain circumstances, which will be detailed hereinbelow, it is desirable that follower pin 66 be locked out of engagement with cam 47. To this end, there is provided a safety latch mechanism shown in Figures 2 and 3 of the drawing. This latch mechanism includes a solenoid 104 (Figure 3) carried by a number of posts 105 which extend upwardly from plate 32 (Figure 2). The armature 106 of solenoid 104 is pinned to a latch arm 107 which, as shown in Figure 3, has a hub 108 rockably mounted on shaft 50. The free end of latch arm 107 is generally L-shaped, as shown in Figure 3, and includes a finger 109 which underlies magnet armature 68 (Figure 3) adjacent flange 67. To the left-hand end of latch arm 107, as shown in Figure 2, is attached one end of a spring 110, which spring extends through the web 84a of bracket 84, and has its other end fastened to a screw 111 threaded into this bracket. Spring 110 accordingly constantly biases latch arm 107 counterclockwise, tending to move latch finger 109 toward the axis of the follower pin flange 67 (Figure 3). Of course, when solenoid 104 is energized, it swings arm 107 clockwise against the pull of spring 110 so that latch finger 109 is removed from flange 67.

As shown in Figures 4 and 8, the depth of cam slot 47 varies from a maximum at point A to a minimum at point D. In fact, at point D the slot terminates. Accordingly, as follower pin 66 rides along the slot from point A to point D, it is ultimately pushed upwardly, and with it armature 68. Flange 67 (Figure 3) lifts with the follower pin 66 and accordingly when the pin rides out of the cam slot, the bottom of the flange is above the top of latch finger 109. If solenoid 104 is deenergized at this time, latch finger 109 will be swung beneath flange 67 by spring 110, thus locking follower pin 66 in its uppermost position from which it cannot move until solenoid 104 is reenergized. It should also be noted that this lifting of follower pin 66 in the slot end of cam slot 47 moves armature 68 very close to magnet 74, facilitating attraction of the armature when the magnet is reenergized.

As noted hereinbefore, end 41a (Figure 2) of supporting plate 41 provides a support for an iris diaphragm, diagrammatically and generally indicated at 112. The diaphragm includes a large gear 113 which is driven through a gear train comprising gears 114, 115, 116 and 117 by a pinion 118 fastened to the lower end of an operating rod 119. This rod is preferably of a telescopic type similar to shutter speed adjusting rod 97, and has secured to its upper end an operating knob (not shown) similar to operating knob 28 (Figure 1) and located adjacent thereto. The gear train connecting pinion 118 to diaphragm gear 113 is mounted between plates 39 and 40 in any suitable manner, and accordingly there is provided a simple but effective means for adjusting the diaphragm to the desired aperture.

As previously explained, an exposure is made when holding magnet 74 is deenergized. This deenergization is effected by a circuit (Figure 9) which includes the contacts 77a and 78a, the safety latch solenoid 104, a vacuum tube generally indicated at 125, and a trip switch 126. The tube 125 is a conventional triode having a plate 125a, a grid 125b and a cathode 125c. The plate 125a is connected by a lead 128 to one side of the magnet 74, the other side of the magnet being connected by a lead 129 to the positive terminal of a battery 127. The cathode 125c is connected by a lead 130 to the grounded negative terminal of battery 127. A resistance 131 is connected between grid 125b and cathode 125c by leads 132 and 133. The right side of a condenser 134 is connected by a lead 135 to grid 125b, and the left side of the condenser by a lead 136 to the left side of a second condenser 137. The right side of condenser 137 is connected by a lead 138 to lead 133, and thence to cathode 125c. Condenser 137 is larger than condenser 134, for reasons which will be explained hereinafter.

Figure 9:
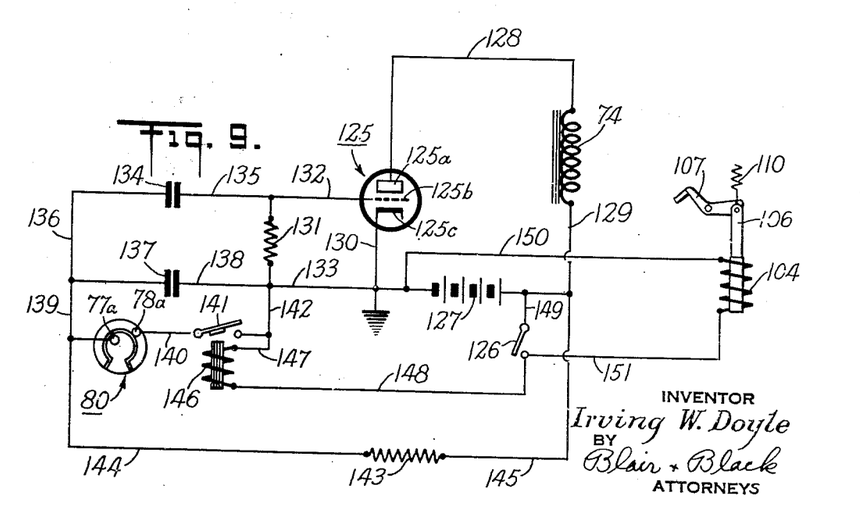
Figure 9 is the wiring diagram of the control circuit for the shutter.
Figures 11, 12:
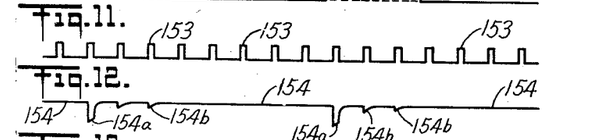
Figure 13:
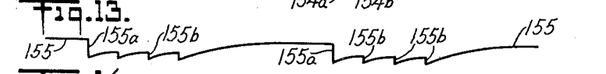
Figures 14, 15:
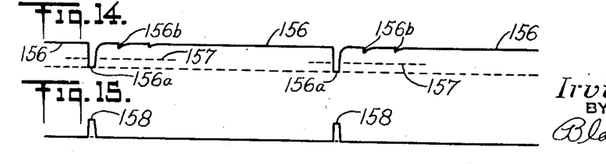

Contact 77a is connected by a lead 139 to the left side of condenser 137 and contact 78a by a lead 140 to a switch 141, which is in turn connected to the right side of condenser 137 by a lead 142. A resistance 143 is connected by leads 144 and 145 to the contact 77a and to the positive terminal of battery 127, respectively.

Switch 141 is operated by a time delay relay 146, which is connected at one end by a lead 147 to the negative terminal of battery 127, and by a lead 148 to one contact of trip switch 126. The other contact of switch 126 is connected by a lead 149 to the positive terminal of battery 127. Solenoid 104 is also connected in series with the battery and switch 126 by leads 150 and 151.

Trip switch 126 may be located in the camera magazine so as to be periodically closed to initiate a complete cycle of operation of the camera. When the switch closes, a circuit is established from battery 127 through the switch and solenoid 104, causing the solenoid to be energized and the safety latch 107 to be released. At the same time relay 146, which is of the time delay type, is energized, causing switch 141 to close after a brief interval, which assures that safety latch 107 has been released. An exposure is obtained when switch 141 and the switch comprising contacts 77a and 78a close at the same time, as will now be explained.

In the steady state condition, condensers 134 and 137 are charged through resistances 143 and 131 to the potential of battery 127. As a result, the left side of condensers 134 and 137 have a positive potential, and the right sides of the condensers are at ground potential. Current will therefore flow through tube 125 and holding magnet 74. When switch 141 and the contacts 77a and 78a are closed at the same time, condenser 137 is short-circuited through the switches so that the left side of condenser 137 immediately drops to ground potential. Condenser 134 also starts to discharge through the switches 141 and 77a—78a and resistance 131, but its discharge lags behind that of condenser 137, because of its relatively small capacitance and the retarding effect of resistance 131. The condenser 134, therefore, is still considerably charged when contacts 77a and 78a open, and is able to discharge only slowly through condenser 137, which has a large capacitance. Accordingly, the right side of condenser 134 drops to a potential below ground and causes tube 125 to be cut off. This causes very rapid deenergization of holding magnet 74 so that follower pin 66 (Figure 4) enters cam slot 47, causing actuation of the shutter, as described.

Tube 125 (Figure 9), however, is cut off only for an instant, because the circuit between contacts 77a and 78a is broken, as described. Hence, condensers 134 and 137 are immediately recharged by battery 127 through resistances 143 and 131 in a direction to cause the grid side of resistance 131 to be slightly positive with respect to the cathode side. The resultant current through tube 125 causes magnet 74 to be energized and the pin 66 withdrawn from cam slot 47, precluding shutter actuation.

As may be seen from Figure 10, trip switch 126 is energized for a much longer period during each cycle of operation than the motor switch 77a—78a, the closing of switches 126 and 77a—78a being represented at 152 and 153, respectively. Accordingly, the switch 77a—78a will close a number of times for one closing of switch 126. However, an exposure will be obtained only when switch 77a—78a closes for the first time after the closing of switch 126, since for subsequent closings of the motor switch condensers 134 and 137 will not be sufficiently recharged to cut off tube 125. The voltage on the grid 125b is diagrammatically indicated by curve 154, which shows the relatively great voltage drop 154a when the switch 77a—78a first closes after the closing of trip switch 126, and the smaller voltage drops 154b resulting from subsequent closings of the motor switch. The voltage drop across condenser 137 is diagrammatically indicated at curve 155; the condenser discharge causing an exposure to be made is indicated at 155a, and subsequent short circuits are indicated at 155b. The drop in the current through magnet 74 is indicated by curve 156, the current drop 156a corresponding to the voltage drop 154a, and the current drops 156b corresponding to the voltage drops 154b. Line 157 shows the current below which magnet 74 is deenergized to effect shutter operation, and, as may be seen, only the current drop 156a is of sufficient magnitude to obtain this exposure. Accordingly, for each closing of switch 126, only one shutter exposure, diagrammatically indicated at 158, is obtained. When switch 126 opens, battery 127 is able to completely recharge condensers 134 and 137, so that the circuit is reconditioned for shutter operation when switch 126 again closes to initiate another cycle of operation.

Accordingly I have provided a high speed aerial camera shutter which attains the several objects set forth hereinabove in a thoroughly practical and efficient manner.

As many possible embodiments may be made of the above invention, and as many changes might be made in the embodiment above set forth, it is to be understood that all matter hereinbefore set forth or shown in the accompanying drawing is to be interpreted as illustrative and not in a limiting sense.

I claim:

1. In shutter construction the combination of a continuously operable motor, a cam coupled to said motor so as to be continuously driven thereby, an opaque shutter, means normally holding said shutter stationary, a driving mechanism coupled to said shutter to impart motion thereto, cam follower means on said shutter driving mechanism engageable with said cam, means normally holding said follower from engagement with said cam, and means selectively operable to effect engagement between said follower and said cam to operate said shutter.

2. In apparatus for controlling the passage of radiation through an optical system, the combination of a motor including a continuously rotatable shaft, a cam coupled to the shaft of said motor so as to be continuously rotated thereby, an opaque shutter to interrupt passage of radiation through the optical system, means normally holding said shutter stationary, driving means coupled to said shutter so as to impart motion to said shutter when said driving means is operated, a cam follower on said shutter driving means engageable with said continuously rotated cam, means normally holding said cam follower out of engagement with said cam, means selectively operable to effect engagement between said follower and said rotating cam to operate said shutter driving means, and means for disengaging said follower from said cam after one revolution thereof.

3. In apparatus for controlling the passage of light through an optical system, the combination of a variable speed electric motor, a rotatable cam continuously driven by said motor, an opaque shutter, means normally holding said shutter stationary in a position to obstruct the passage of light, driving means coupled to said shutter to move said shutter from and to said normal position, a cam follower coupled to said shutter driving means and engageable with said rotatable cam, means normally restraining said follower from engagement with said cam, means optionally operable to release said restraining means, means operable upon release of said restraining means to effect engagement between said follower and said continuously driven cam, and means to disengage said follower from said cam after one revolution thereof.

4. In apparatus for controlling the passage of light through the optical system of a camera, the combination of a variable speed motor, a cam coupled to said motor so as to be driven thereby, an opaque shutter, a driving mechanism including a cam follower coupled to said shutter, means biasing said follower toward engagement with said cam, energizable restraining means normally holding said follower out of engagement with said cam, means under the control of an operator for interrupting energization of said restraining means to effect engagement between said cam and said follower, and means for disengaging said follower from said cam after each operation thereof.

5. In apparatus for controlling the passage of light through the optical system of a camera, the combination of a motor, a cam driven by said motor, an opaque shutter interposed in the optical path, means normally holding said shutter stationary, a cam follower coupled to said shutter and engageable with said cam to impart motion to said shutter, electromagnetic means normally energized to restrain said follower from engagement with said cam, means under the optional control of an operator for de-energizing said electromagnetic means, means operable upon de-energization of said electromagnetic means to effect engagement between said follower and said cam, means operable after each engagement of said follower with said cam to re-energize said electromagnetic means, and means including said electro-magnetic means re-energized to disengage said follower from said cam.

6. In apparatus for controlling the passage of light through the optical system of a camera, the combination of an opaque shutter, means normally holding said shutter stationary in a position to obstruct the passage of light through the optical system, a link coupled to said shutter to move said shutter from and to said normal position, a cam follower coupled to said link, a motor, a cam driven by said motor, means biasing said cam follower toward engagement with said cam, electromagnetic means normally energized to restrain said follower from engagement with said cam, electronic means for momentarily de-energizing said electromagnetic means to allow said cam follower to engage said cam, means including said electronic means for re-energizing said electro-magnetic means after each momentary de-energization thereof, and means including said electromagnetic means re-energized for disengaging said follower from said cam.

7. In apparatus for controlling the passage of light through the optical system of a camera, the combination of a shutter blade pivotally mounted about an axis substantially parallel to the axis of the camera optical system, means normally holding said shutter stationary in a position to obstruct the passage of light through the optical system, a link coupled to said shutter to move said shutter from and to said normal position, a cam follower coupled to said link, a continuously operating electric motor, a cam coupled to the shaft of said motor so as to be continuously rotated thereby, means normally biasing said cam follower towards engagement with said cam, electromagnetic means normally energized to hold said cam follower against said biasing means from engagement with said cam, and electronic means under the control of an operator for momentarily releasing said electromagnetic means to allow said cam follower to engage said rotating cam through one revolution thereof, whereby said shutter is rapidly moved from and restored to its normal position.

8. In apparatus for controlling the passage of light through an optical system, the combination of a shutter normally interposed in the optical system to obstruct the passage of light therethrough, a link coupled to said shutter, a cam follower coupled to said link, a variable speed electric motor, a continuously rotatable cam coupled to the shaft of said motor and rotated thereby, biasing means urging said cam follower towards engagement with said cam, electromagnetic restraining means normally energized to restrain said follower from engagement with said cam, electronic means including a thermionic valve under the control of an operator for momentarily de-energizing said electro-magnetic means to allow said cam follower to engage said rotating cam through one revolution thereof, and a safety latch movable into engagement with said cam follower restraining means for holding said follower from engagement with said cam when said latch is so moved.

9. In apparatus for controlling the passage of light through an optical system, the combination of an opaque shutter blade pivotally mounted on an axis substantially parallel to the axis of the optical system, means normally holding said shutter stationary in a position to obstruct the passage of light through the system, a link coupled to said shutter to move said shutter from and to said normal position, a cam follower coupled to said link, a continuously operating variable speed electric motor, a continuously rotatable cam coupled to the shaft of said motor so as to be continuously rotated thereby, biasing means normally urging said cam follower towards engagement with said cam, electromagnetic restraining means normally energized to hold said follower from engagement with said cam, electronic means including a thermionic valve under the control of an operator for momentarily releasing said restraining means to allow said cam follower to engage said rotating cam, means including said electronic means for re-energizing said electromagnetic means to disengage said follower from said cam after one revolution thereof, a safety latch normally interposed between said follower and said cam, and electromagnetic means operable to remove said safety latch from its normal position prior to release of said restraining means.

References Cited in the file of this patent

UNITED STATES PATENTS

| Number | Name | Date |
| --- | --- | --- |
| 638,103 | Edgecomb | Nov. 28, 1899 |
| 1,620,304 | Underwood | Mar. 8, 1927 |
| 1,887,103 | Merle | Nov. 8, 1932 |
| 2,347,700 | Aronoff | May 2, 1944 |
| 2,359,116 | Johnson | Sept. 26, 1944 |
| 2,371,072 | Simmon et al. | Mar. 6, 1945 |
| 2,383,381 | Hammond | Aug. 21, 1945 |
| 2,399,476 | Doyle et al. | Apr. 30, 1946 |
| 2,448,736 | Rabinowitz | Sept. 7, 1948 |